US009784450B2

(12) United States Patent
Nakamura et al.

(10) Patent No.: US 9,784,450 B2
(45) Date of Patent: Oct. 10, 2017

(54) GLOW PLUG WITH COMBUSTION PRESSURE SENSOR

(75) Inventors: Yoshihiro Nakamura, Iwakura (JP); Shunsuke Maeda, Toyota (JP); Tadashi Watanabe, Komaki (JP); Masayoshi Matsui, Ichinomiya (JP)

(73) Assignee: NGK SPARK PLUG CO., LTD., Aichi (JP)

( * ) Notice: Subject to any disclaimer, the term of this patent is extended or adjusted under 35 U.S.C. 154(b) by 336 days.

(21) Appl. No.: 13/976,565

(22) PCT Filed: Feb. 7, 2012

(86) PCT No.: PCT/JP2012/000803
§ 371 (c)(1),
(2), (4) Date: Jun. 27, 2013

(87) PCT Pub. No.: WO2012/114664
PCT Pub. Date: Aug. 30, 2012

(65) Prior Publication Data
US 2013/0269640 A1    Oct. 17, 2013

(30) Foreign Application Priority Data
Feb. 25, 2011  (JP) .................................. 2011-039112

(51) Int. Cl.
*F23Q 7/00*    (2006.01)
*G01L 23/22*   (2006.01)
(Continued)

(52) U.S. Cl.
CPC ............ *F23Q 7/001* (2013.01); *F02P 19/028* (2013.01); *G01L 23/22* (2013.01); *F02D 35/023* (2013.01); *F23Q 2007/005* (2013.01)

(58) Field of Classification Search
CPC ............... F23Q 7/001; F23Q 2007/002; F23Q 2007/005; F02P 19/028; G01L 23/22; F02D 35/023
(Continued)

(56) References Cited

U.S. PATENT DOCUMENTS

| 7,185,621 B2 * | 3/2007 | Yamada | G01L 23/22 |
| | | | 123/145 A |
| 7,329,836 B2 * | 2/2008 | Suzuki | F23Q 7/001 |
| | | | 219/260 |

(Continued)

FOREIGN PATENT DOCUMENTS

| CH | WO 2007096208 A1 * | 8/2007 | ............. F23Q 7/001 |
| DE | WO 2006072514 A1 * | 7/2006 | ............. G01L 23/22 |

(Continued)

OTHER PUBLICATIONS

"Stiffness." Stiffness. Wikipedia, Feb. 22, 2010. Web. Nov. 16, 2015 https://web.archive.org/web/20100222091125/http://en.wikipedia.org/wiki/Stiffness.*

*Primary Examiner* — Jacob Amick
*Assistant Examiner* — Michael A Kessler
(74) *Attorney, Agent, or Firm* — Sughrue Mion, PLLC

(57) ABSTRACT

A glow plug including a substantially cylindrical housing extending in an axial direction; a rod-shaped heater unit having a front end protruding from the front end of the housing and movable in the axial direction; a connecting member connecting the heater unit to the housing within the housing and allowing the heater unit to move in the axial direction; and a pressure sensor that detects pressure received by the heater unit. The heater unit has a large-diameter portion at the rear end thereof and a small-diameter portion frontward of the large-diameter portion and having a diameter smaller than the diameter of the large-diameter (Continued)

portion. The connecting member connects the small-diameter portion of the heater unit to the housing within the housing.

5 Claims, 2 Drawing Sheets

(51) Int. Cl.
*F02P 19/02* (2006.01)
*F02D 35/02* (2006.01)

(58) Field of Classification Search
USPC ....... 219/267, 270, 526, 534, 541, 544, 553; 73/114.18, 114.16–114.19, 179.21; 123/145 A, 145 R, 179.5, 179.6, 435
See application file for complete search history.

(56) References Cited

U.S. PATENT DOCUMENTS

| | | | | |
|---|---|---|---|---|
| 7,581,520 B2* | 9/2009 | Kern | ........................ | G01L 23/22 123/145 A |
| 7,712,444 B2* | 5/2010 | Kern | ........................ | F23Q 7/001 123/145 A |
| 7,829,824 B2* | 11/2010 | Last | ........................ | F23Q 7/001 219/260 |
| 7,954,382 B2* | 6/2011 | Kern | ........................ | G01L 23/10 73/35.12 |
| 8,250,909 B2* | 8/2012 | Kern | ........................ | G01L 23/10 73/114.16 |
| 8,893,545 B2* | 11/2014 | Nakamura | ............ | G01M 15/08 73/114.18 |
| 2004/0182144 A1* | 9/2004 | Okazaki | ................ | F02P 19/028 73/114.18 |
| 2009/0056663 A1 | 3/2009 | Ramond et al. | | |
| 2011/0005308 A1* | 1/2011 | Kern | ........................ | F23Q 7/001 73/114.16 |
| 2013/0269641 A1* | 10/2013 | Watanabe | ............... | F23Q 7/001 123/145 A |
| 2014/0373799 A1* | 12/2014 | Suzuki | ..................... | F23Q 7/00 123/145 A |

FOREIGN PATENT DOCUMENTS

| | | | | |
|---|---|---|---|---|
| DE | WO 2007073959 A1 * | 7/2007 | ............. | F23Q 7/001 |
| DE | 102007049971 A1 * | 4/2009 | ............. | F23Q 7/001 |
| JP | 53-048136 A | 5/1978 | | |
| JP | 2006-010306 A | 1/2006 | | |
| JP | 2008-536085 A | 9/2008 | | |
| JP | 2009-520941 A | 5/2009 | | |
| JP | 2010-139148 A | 6/2010 | | |
| WO | 2007/073959 A1 | 7/2007 | | |

* cited by examiner

GLOW PLUG WITH COMBUSTION PRESSURE SENSOR

CROSS-REFERENCE TO RELATED APPLICATIONS

This application is a National Stage of International Application No. PCT/JP2012/000803filed Feb. 7, 2012, claiming priority based on Japanese Patent Application No. 2011-039112, filed Feb. 25, 2011, the contents of all of which are incorporated herein by reference in their entirety.

TECHNICAL FIELD

The present invention relates to a glow plug and particularly to a glow plug with a combustion pressure sensor.

BACKGROUND ART

One of widely known conventional glow plugs used in internal combustion engines such as diesel engines is a glow plug equipped with a pressure sensor for detecting combustion pressure in an internal combustion engine. Such a glow plug typically includes a housing, and a heater unit protruding from the housing. For example, Patent Document 1 discloses a glow plug including a heater unit (finger) which is reduced in diameter stepwise such that the heater unit has a small-diameter front portion and a large-diameter rear portion. The heater unit of the glow plug described in Patent Document 1 is connected to a housing (body) through a membrane-like connecting member that allows the heater unit to move in an axial direction. A sensor disposed in the glow plug detects the axial displacement of the heater unit to thereby detect combustion pressure.

However, in the glow plug described in Patent Document 1, since the connecting member is connected to the large-diameter section of the heater unit, a limitation is imposed on the area of the connecting member. Therefore, the amount of axial displacement permitted for the heater unit is not sufficient, so that the accuracy in detecting combustion pressure may be low.

PRIOR ART DOCUMENT

Patent Document

Patent Document 1: Japanese Kohyo (PCT) Patent Publication No. 2008-536085

SUMMARY OF THE INVENTION

Problem to be Solved by the Invention

In view of the foregoing problem, an object to be achieved by the present invention is to provide an improved structure of a glow plug with a combustion pressure sensor (hereinafter may be referred to as a "combustion pressure sensor-equipped glow plug") which includes a heater unit which is reduced in diameter stepwise. In the improved structure, the area of a member connecting the heater unit to a housing is rendered sufficiently large, so that the detection accuracy of the pressure sensor is improved. With this structure, the detection accuracy of the pressure sensor can be further improved.

Means for Solving the Problem

The present invention has been made to solve, at least partially, the above problem and can be embodied in the following modes or application examples.

APPLICATION EXAMPLE 1

A combustion pressure sensor-equipped glow plug comprising a substantially tubular housing extending in an axial direction; a rod-shaped heater unit having a rear end disposed within the housing and a front end protruding from a front end of the housing, the heater unit being movable in the axial direction; a connecting member which connects the heater unit to the housing within the housing and allows the heater unit to move in the axial direction; and a pressure sensor which is disposed in the housing and detects combustion pressure according to an amount of movement of the heater unit in the axial direction, the combustion pressure sensor-equipped glow plug being characterized in that the heater unit has a large-diameter portion formed at a rear end thereof and a small-diameter portion formed frontward of the large-diameter portion and having a diameter smaller than a diameter of the large-diameter portion, and the connecting member connects the small-diameter portion of the heater unit to the housing within the housing.

APPLICATION EXAMPLE 2

A combustion pressure sensor-equipped glow plug according to application example 1, wherein the pressure sensor is disposed within the housing at a position rearward of the heater unit, the combustion pressure sensor-equipped glow plug further comprises a transmission member which is fixed to the large-diameter portion and to the pressure sensor and transmits the amount of movement of the heater unit from the large-diameter portion to the pressure sensor, and the connecting member is connected to the small-diameter portion at a position in proximity to the large-diameter portion.

APPLICATION EXAMPLE 3

A combustion pressure sensor-equipped glow plug according to application example 1 or 2, further comprising a rod-shaped inner shaft which is disposed in the housing and supplies electric power in order for the heater unit to generate heat, wherein the inner shaft is disposed over the entire length of the large-diameter portion in the axial direction.

APPLICATION EXAMPLE 4

A combustion pressure sensor-equipped glow plug according to any one of application examples 1 to 3, wherein the heater unit generates heat mainly in a region within the small-diameter portion located frontward of the housing.

APPLICATION EXAMPLE 5

A combustion pressure sensor-equipped glow plug according to any one of application examples 1 to 4, wherein the housing has a threaded portion on an outer circumference thereof, and a diameter of the threaded portion is 9 mm or less.

The present invention can be implemented not only as a glow plug with a combustion pressure sensor as described above, but also as a method of producing a glow plug with a combustion pressure sensor and an internal combustion engine including a glow plug with a combustion pressure sensor.

Advantageous Effects of the Invention

In the configuration of application example 1, the connecting member connecting the heater unit to the housing is disposed within the housing and connected to the small-diameter portion of the heater unit. Therefore, the distance between the small-diameter portion of the heater unit and the inner circumferential surface of the housing in a direction orthogonal to the axis can be larger than the distance between the large-diameter portion of the heater unit and the inner circumferential surface of the housing, and the connecting member can thereby have an increased area. This allows the movable amount of the heater unit in the axial direction to be increased. Therefore, the S/N ratio of the pressure sensor can be improved, and the accuracy in detecting pressure can be improved. Since the connecting member has an increased area, the spring constant of the connecting member can be decreased, and therefore the durability of the connecting member can be improved. In the above configuration, even through the heater unit has the large-diameter portion located within the housing, the connecting member is connected to the small-diameter portion of the heater unit within the housing. Therefore, during transmission of displacement of the heater unit allowed by the connecting member to the pressure sensor, a load acts on the highly stiff large-diameter portion, and an unbalanced load is less likely to act on the pressure senor. In this structure, displacement of the heater unit can be reliably transmitted to the pressure sensor, and the accuracy in detecting combustion pressure can thereby be improved.

In the configuration of application example 2, the connecting member is connected to the small-diameter portion of the heater unit at a position in proximity to the large-diameter portion. This allows displacement of the heater unit to be efficiently transmitted to the large-diameter portion of the heater unit and the transmission member. Therefore, the response of the pressure sensor and the accuracy of the detection of pressure can be improved.

In the configuration of application example 3, the large-diameter portion of the heater unit contains therein the rod-shaped inner shaft that supplies electric power in order for the heater unit to generate heat. The inner shaft is made of a metal for the purpose of supplying electric power, has a rod-like shape, and therefore has high stiffness. This configuration further enhances the effect of increasing the stiffness by the large-diameter portion recited in application example 1 described above. In addition, the detection accuracy of the pressure sensor can be further improved.

In the configuration of application example 4, the small-diameter portion disposed frontward of the housing mainly generates heat. Therefore, a combustion chamber can be efficiently heated.

In a small-diameter glow plug including a threaded portion having a diameter of 9 mm or less, it is difficult to make the area of the connecting member sufficiently large. However, in the glow plug of application example 5, the effects of the above application examples appear more markedly.

MODES FOR CARRYING OUT THE INVENTION

Figure 1:
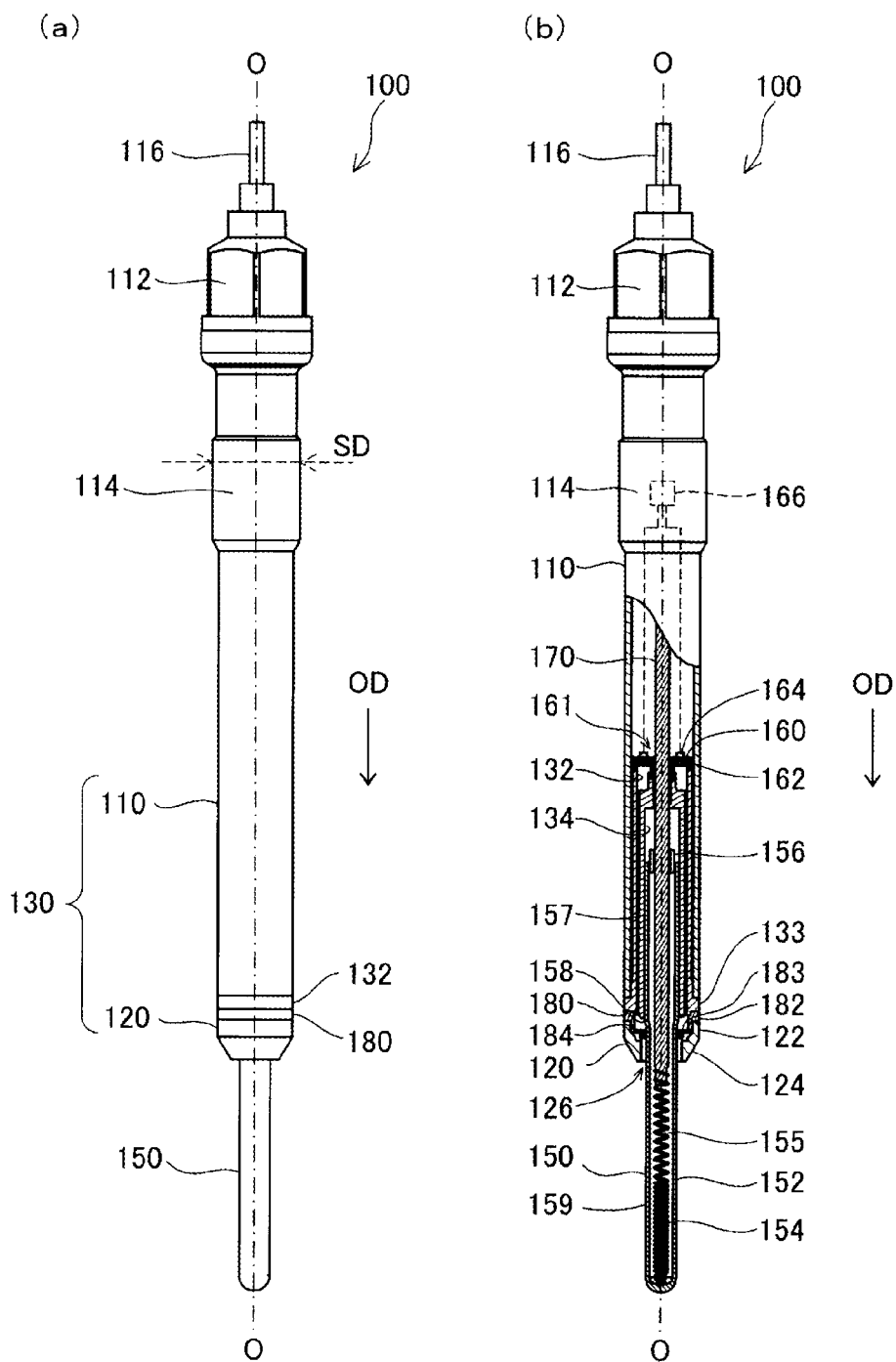
FIG. 1 Set of diagrams illustrating the structure of a glow plug according to one embodiment of the present invention.
Figure 2:
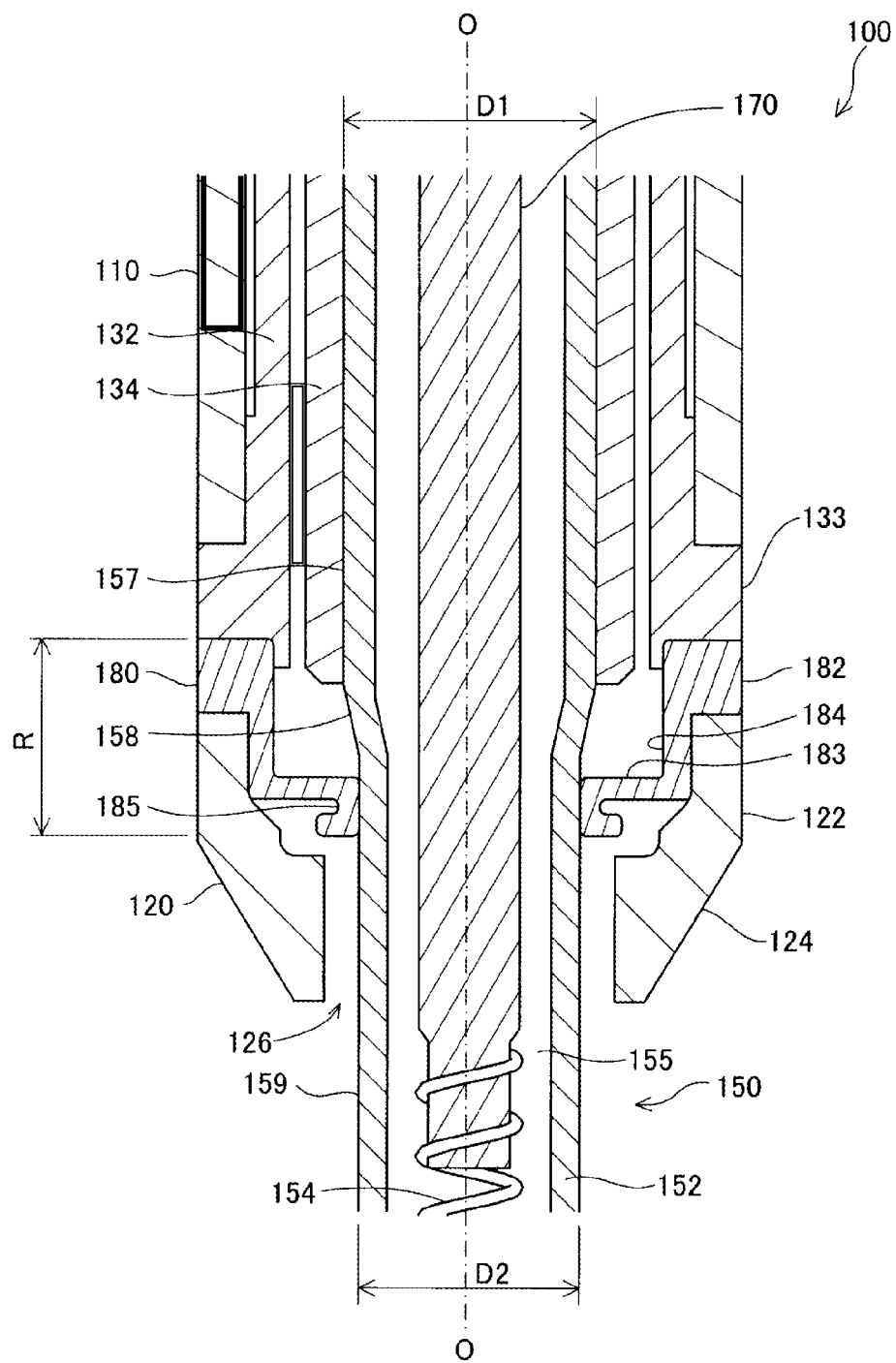
FIG. 2 Enlarged cross-sectional view of the vicinity of a connecting member.

FIG. 1 is a set of diagrams illustrating the structure of a glow plug 100 according to one embodiment of the present invention. FIG. 1(a) shows the overall structure of the glow plug 100, and FIG. 1(b) is a partially sectioned view showing the structure. FIG. 2 is an enlarged cross-sectional view of the vicinity of a connecting member 180 to be described later. In the following description, the lower side of the glow plug 100 along an axis O in FIGS. 1 and 2 is referred to as the front side of the glow plug 100, and the upper side is referred to as the rear side. In addition, a downward direction along the axis O of the glow plug 100 is referred to as an axial direction OD. As shown in FIGS. 1(a) and 1(b), the glow plug 100 comprises a housing 130 including a metallic shell 110 and a cap member 120, and a heater unit 150.

The metallic shell 110 is a substantially cylindrical metal member formed of carbon steel or stainless steel. A tool engagement portion 112 for engagement with a tool for attaching the glow plug 100 to an internal combustion engine is formed at the rear end of the metallic shell 110, and a threaded portion 114 having a thread groove (not shown) formed therein to secure the glow plug 100 to a cylinder head is provided frontward of the tool engagement portion 112. In this embodiment, the diameter (nominal diameter) SD of the threaded portion 114 is equal to or less than M9 (diameter: 9 mm) and is preferably M8 or M9. The glow plug 100 can be fixed to an internal combustion engine by engaging a tool with the tool engagement portion 112 and screwing the threaded portion 114 into a plug attachment hole in the internal combustion engine. A plurality of wires 116 electrically connected to an integrated circuit 166 (described later) and an inner shaft 170 (described later) that are disposed in the housing 130 are inserted from the rear end of the tool engagement portion 112.

The cap member 120 is disposed at the front end of the metallic shell 110. The cap member 120 is an annular metal member formed of carbon steel or stainless steel. The cap member 120 has a cylindrical portion 122 which is formed on its rear side and which extends along the axis O while maintaining a substantially fixed outer diameter; and a tapered portion 124 which is formed on the front side and which is tapered such that the diameter decreases toward the front end thereof. When the glow plug 100 is attached to an internal combustion engine, the tapered surface of the tapered portion 124 comes into close contact with a prescribed seat surface of a plug attachment hole of the internal combustion engine. Thus, the airtightness of a combustion chamber is ensured.

The heater unit 150 includes a sheath tube 152, a heat-generating coil 154, and an insulating powder 155. The sheath tube 152 is formed of, for example, stainless steel having high heat resistance and high corrosion resistance. The sheath tube 152 has a closed hemispherical front end and an open rear end located within the metallic shell 110. The heat-generating coil 154 is a wire-wound resistor and is disposed inside the sheath tube 152 at the front end thereof. The inner shaft 170 (a rod-like member made of metal) is inserted into the heater unit 150, and the rear end of the heat-generating coil 154 is connected to the front end of the inner shaft 170. Electric power is externally supplied to the heat-generating coil 154 through one of the wires 116 and the inner shaft 170. The space between the sheath tube 152 and the heat-generating coil 154 is filled with the insulating powder 155, which is powder of a heat resisting material such as magnesium oxide. A sealing member 156 for confining the insulating powder 155 in the sheath tube 152 is inserted into the gap between the open rear end of the sheath tube 152 and the inner shaft 170. The sheath tube 152 has been subjected to swaging. This improves the denseness of the insulating powder 155 filling the sheath tube 152, and the efficiency of heat conduction is thereby improved. The heater unit 150 having the above configuration is disposed such that its rear end is disposed within the metallic shell 110 and the front end protrudes from an opening 126 of the cap member 120 in the axial direction OD.

In this embodiment, as a result of the swaging performed on the sheath tube 152, the heater unit 150 has a large-diameter portion 157, a step portion 158, and a small-diameter portion 159 (see FIG. 2). The large-diameter portion 157 is formed on the rear side of the heater unit 150 and has a diameter D1 of, for example, about 4.0 mm. The small-diameter portion 159 is formed on the front side of the heater unit 150 and has a diameter D2 of, for example, about 3.5 mm. The step portion 158 is disposed between the large-diameter portion 157 and the small-diameter portion 159 and is tapered down toward the front end thereof. Among the large-diameter portion 157, the step portion 158, and the small-diameter portion 159, the small-diameter portion 159 protrudes from the front end of the housing 130. In other words, in this embodiment, the large-diameter portion 157 and the step portion 158 are disposed within the housing 130. In this embodiment, the inner shaft 170 is disposed so as to extend over the entire length of the large-diameter portion 157 in the axial direction OD, and the front end of the inner shaft 170 is located within the small-diameter portion 159 at a position frontward of the housing 130. The heat-generating coil 154 is connected to the front end of the inner shaft 170. Since the heat-generating coil 154 is disposed so as to extend to the front end of the sheath tube 152, the heater unit 150 generates heat mainly in a region located frontward of the housing 130. The inner shaft 170 may be formed and disposed such that the front end of the inner shaft 170 remains within the large-diameter portion 157 without extending into the small-diameter portion 159.

The housing 130 contains an annular pressure sensor 160 (see FIG. 1) disposed rearward of the heater unit 150, a sensor-fixing member 132 for fixing the pressure sensor 160 to the housing 130, a transmission sleeve 134 for transmitting displacement of the heater unit 150 along the axis O to the pressure sensor 160, and the connecting member 180 for connecting the outer circumference of the heater unit 150 to the inner side of the housing 130.

The sensor-fixing member 132 is a substantially cylindrical member formed of, for example, stainless steel. The sensor-fixing member 132 is disposed along the inner circumference of the metallic shell 110 and has a collar-shaped flange portion 133 formed at the front end of the sensor-fixing member 132. The flange portion 133 is welded to the front end surface of the metallic shell 110. The outer circumference of the pressure sensor 160 is welded to the rear end of the sensor-fixing member 132. In this embodiment, the sensor-fixing member 132 holds the pressure sensor 160 at a position near the central portion of the housing 130.

The transmission sleeve 134 is a substantially cylindrical member formed of, for example, stainless steel. The transmission sleeve 134 is disposed between the sensor-fixing member 132 and the heater unit 150. The front end portion of the transmission sleeve 134 is welded to the front end portion of the large-diameter portion 157 of the heater unit 150, and the rear end of the transmission sleeve 134 is welded to the inner circumference of the annular pressure sensor 160. The displacement of the heater unit 150 along the axis O is transmitted to the inner circumference of the pressure sensor 160 through the transmission sleeve 134.

The connecting member 180 is an elastic annular member formed of, for example, stainless steel or a nickel alloy. The connecting member 180 includes a collar-shaped flange portion 182 disposed at its rear end, a thin-film-like flat portion 183 disposed at the front end, and a cylindrical portion 184 connecting the flange portion 182 to the flat portion 183. The upper surface (the rear end surface) of the flange portion 182 is welded to the flange portion 133 of the sensor-fixing member 132, and the lower surface (the front end surface) of the flange portion 182 is welded to the rear end surface of the cap member 120. As shown in FIG. 2, the flat portion 183 has at its inner circumference a folded portion 185 folded frontward. The connecting member 180 is welded through the folded portion 185 to the small-diameter portion 159 of the heater unit 150 at a position near the rear end thereof. In this embodiment, the position of the rear end of the small-diameter portion 159 of the heater unit 150 (i.e., the front end of the step portion 158) along the axis O is located within a range R occupied by the connecting member 180 (the flange portion 182, the cylindrical portion 184, the flat portion 183, and the folded portion 185) along the axis O. The heater unit 150 is connected to the housing 130 through the connecting member 180, and the elasticity of the connecting member 180 allows the heater unit 150 to be displaced along the axis O. The connecting member 180 connecting the heater unit 150 to the housing 130 also plays a role in ensuring airtightness between a combustion chamber and the interior of the metallic shell 110.

The pressure sensor 160 (see FIG. 1) includes an annular metallic diaphragm 162 having at its center an opening 161 through which the inner shaft 170 passes, and a piezoresistor 164 joined to the upper surface (the rear end surface) of the metallic diaphragm 162. The metallic diaphragm 162 is formed of, for example, stainless steel. The integrated circuit 166 disposed at a prescribed position in the housing 130 is electrically connected to the piezoresistor 164. As described above, the rear end of the transmission sleeve 134 connected to the heater unit 150 is joined to the inner circumference of the metallic diaphragm 162. Therefore, when the heater unit 150 receives combustion pressure and is displaced along the axis O, the displacement is transmitted to the metallic diaphragm 162 through the transmission sleeve 134, and the metallic diaphragm 162 is thereby deformed. The integrated circuit 166 detects the deformation of the metallic diaphragm 162 by means of using the piezoresistor 164 to thereby detect the combustion pressure of the internal combustion engine. The integrated circuit 166 outputs an electric signal indicating the detected combustion pressure to, for example, an external ECU though the wires 116 inserted from the rear end of the metallic shell 110.

In the embodiment described above, the connecting member 180 connecting the heater unit 150 to the housing 130 is connected to the small-diameter portion 159 of the heater unit 150 within the housing 130. Therefore, the area of the thin-walled flat portion 183 can be larger than that when the connecting member 180 is connected to the large-diameter portion 157. As a result, the amount of displacement of the heater unit 150 along the axis O can be made sufficiently large even when the glow plug 100 has a relatively small diameter (i.e., having the threaded portion 114 with a nominal diameter of M9 or less). Therefore, the S/N ratio of the pressure sensor 160 can be improved, and the accuracy in detecting combustion pressure can be improved. In addition, with the flat portion 183 having a large area, the spring constant of the connecting member 180 can be reduced, and the durability of the connecting member 180 can thereby be improved.

In this embodiment, even though the heater unit 150 has the large-diameter portion 157 located within the housing 130, the connecting member 180 is connected to the small-diameter portion 159 of the heater unit 150 within the housing. Therefore, during transmission of displacement of the heater unit 150 allowed by the connecting member 180 to the pressure sensor 160, a load acts on the highly stiff large-diameter portion 157, and an unbalanced load is less likely to act on the pressure sensor. Therefore, displacement of the heater unit 150 can be reliably transmitted to the pressure sensor 160, and the accuracy in detecting combustion pressure can be improved.

In this embodiment, the connecting member 180 is joined to the small-diameter portion 159 of the heater unit 150 at a location near the rear end of the small-diameter portion 159, and the front end of the transmission sleeve 134 is joined to the large-diameter portion 157 at a location which is located near the front end thereof and the rear end of the small-diameter portion 159. Therefore, although the connecting member 180 is connected to the small-diameter portion 159 of the heater unit 150, displacement of the heater unit 150 at a location near the connecting member 180 is efficiently transmitted to the transmission sleeve 134 which is larger in diameter than the small-diameter portion 159 and is high in stiffness along the axis O. This improves the response of the pressure sensor 160 to the displacement of the heater unit 150 along the axis O and can suppress transmission loss.

In this embodiment, the inner shaft 170 is disposed over the entire length of the large-diameter portion 157 in the axial direction OD. Since the inner shaft 170 is made of a metal and has a rod shape, the stiffness of the inner shaft 170 is high. Therefore, the stiffness of the large-diameter portion 157 of the heater unit 150 that contains such an inner shaft 170 is further improved, and this contributes to an improvement in the detection accuracy of the pressure sensor.

In this embodiment, the front end of the inner shaft 170 is located within the small-diameter portion 159 at a position frontward of the housing 130, and the heat-generating coil 154 is connected to the front end of the inner shaft 170. Therefore, the heater unit 150 generates heat mainly in a portion located frontward of the housing 130. Combustion in an internal combustion engine such as a diesel engine may cause accumulation of soot in the front end opening 126 of the housing 130 (i.e., in the gap between the cap member 120 and the heater unit 150). As the amount of accumulated soot increases, the soot bridges the wall surface of the opening 126 and the heater unit 150. This increases the fraction of the heat generated by the heater unit 150 which dissipates (escaping) to the housing 130 through the bridging soot and then to the cylinder head, without being used to heat the combustion chamber of the internal combustion engine. In contrast, in this embodiment, heat is generated mainly within a region which is located frontward of the housing 130; i.e., on the side toward the combustion chamber. Therefore, the amount of heat dissipated to the cylinder head can be smaller than that in a glow plug in which the main part of heat generation extends from the front end of the heater unit 150 to its rear end through the front end of the housing. Accordingly, with the glow plug 100 of the present embodiment, the combustion chamber can be efficiently heated, and the heating ability of the glow plug can be improved.

One embodiment of the present invention has been described above. However, the present invention is not limited to the embodiment and may be embodied in various other forms without departing from the spirit of the invention. For example, in the above embodiment, the nominal diameter of the threaded portion 114 is M9 or less, but the nominal diameter may be M10 or more. In addition, the following modifications are possible.

In the above embodiment, the heater unit 150 is configured with the heat-generating coil 154 embedded in the sheath tube 152 but may be configured differently. For example, the heater unit 150 may be configured as a ceramic heater in which an electrically conductive ceramic is embedded in an electrically insulating ceramic.

In the above embodiment, the heater unit 150 has two portions which differ in diameter from each other; i.e., the large-diameter portion and the small-diameter portion. However, the heater unit 150 may have three or more portions which differ in diameter from one another. In such a case, the connecting member 180 is connected to a portion which is smaller in diameter than the remaining portions.

In the above embodiment, the pressure sensor 160 is composed of the annular metallic diaphragm 162 and the piezoresistor 164. However, the configuration of the pressure sensor 160 is not limited thereto. Any well-known pressure sensor used for a glow plug with a combustion pressure sensor may be used in an appropriate manner.

In the above embodiment, the heater unit 150 is connected to the housing 130 through the connecting member 180 having the thin-film-like flat portion 183. However, for example, the heater unit 150 may be connected to the housing 130 through a bellows-like member.

In the above embodiment, the heater unit 150 is connected to the pressure sensor 160 through the transmission sleeve 134. However, the embodiment may be modified such that the rear end of the heater unit 150 is connected directly to the pressure sensor 160.

In the above embodiment, electric power is supplied to the heater unit 150 through the inner shaft 170. However, the inner shaft 170 may be omitted. Namely, the embodiment may be modified such that electric power is supplied from the wires 116 directly to the heater unit 150.

DESCRIPTION OF REFERENCE NUMERALS

100: glow plug
110: metallic shell
112: tool engagement portion
114: threaded portion
116: wires
120: cap member
122: cylindrical portion
124: tapered portion
126: opening
130: housing
132: sensor-fixing member
133: flange portion
134: transmission sleeve
150: heater unit
152: sheath tube
154: heat-generating coil
155: insulating powder
156: sealing member
157: large-diameter portion 158: step portion
159: small-diameter portion
160: pressure sensor
161: opening
162: metallic diaphragm
164: piezoresistor
166: integrated circuit
170: inner shaft
180: connecting member
182: flange portion
183: flat portion
184: cylindrical portion
185: folded portion

The invention claimed is:

1. A combustion pressure sensor-equipped glow plug comprising:
   a substantially tubular housing extending in an axial direction;
   a rod-shaped heater unit having a rear end disposed within the housing and a front end protruding from a front end of the housing, the heater unit being movable in the axial direction;
   a connecting member which connects the heater unit to the housing within the housing and allows the heater unit to move in the axial direction; and
   a pressure sensor which is disposed in the housing and detects combustion pressure according to an amount of movement of the heater unit in the axial direction,
   the combustion pressure sensor-equipped glow plug being characterized in that
   the heater unit has a large-diameter portion formed at the rear end thereof and a small-diameter portion formed frontward of the large-diameter portion and having a diameter smaller than a diameter of the large-diameter portion, and
   the connecting member connects the small-diameter portion of the heater unit to the housing within the housing,
   a rear end of the small-diameter portion of the heater unit along the axial direction is located within a range occupied by the connecting member along the axial direction,
   the connecting member has a thin-film flat portion disposed at a front end and extended in the radial direction, and a cylindrical portion extended from the flat portion toward a rear end side of the connecting member,
   the flat portion of the connecting member is located within a range occupied by the small-diameter portion of the heater along the axial direction,
   the cylindrical portion is spaced from the large-diameter portion of the heater in the radial direction,
   the heater unit has a step portion which is disposed between the large-diameter portion and the smaller-diameter portion, and at least a part of the cylindrical portion of the connecting member is located within a range occupied by the step portion of the heater along the axial direction,
   the step portion directly connects a front end of the large-diameter portion to the rear end of the small-diameter portion, and
   the front end of the large-diameter portion is located within a range occupied by the housing along the axial direction.

2. The combustion pressure sensor-equipped glow plug as claimed in claim 1, wherein
   the pressure sensor is disposed within the housing at a position rearward of the heater unit,
   the combustion pressure sensor-equipped glow plug further comprises a transmission member which is fixed to the large-diameter portion and to the pressure sensor and transmits the amount of movement of the heater unit from the large-diameter portion to the pressure sensor, and
   the connecting member is connected to the small-diameter portion at a position in proximity to the large-diameter portion.

3. The combustion pressure sensor-equipped glow plug as claimed in claim 1, further comprising a rod-shaped inner shaft which is disposed in the housing and supplies electric power in order for the heater unit to generate heat,
   wherein the inner shaft is disposed over the entire length of the large-diameter portion in the axial direction.

4. The combustion pressure sensor-equipped glow plug as claimed in claim 1, wherein
   the heater unit generates heat mainly in a region within the small-diameter portion located frontward of the housing.

5. The combustion pressure sensor-equipped glow plug as claimed in claim 1, wherein
   the housing has a threaded portion on an outer circumference thereof, and
   a diameter of the threaded portion is 9 mm or less.

* * * * *